United States Patent
Omura et al.

(10) Patent No.: US 10,186,738 B2
(45) Date of Patent: Jan. 22, 2019

(54) CELL MODULE AND MANUFACTURING METHOD FOR CELL MODULE

(71) Applicant: SANYO ELECTRIC CO., LTD., Osaka (JP)

(72) Inventors: Tetsuji Omura, Kasai (JP); Mayumi Nakasato, Ogaki (JP); Fusanori Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 223 days.

(21) Appl. No.: 15/216,519

(22) Filed: Jul. 21, 2016

(65) Prior Publication Data
US 2016/0329617 A1    Nov. 10, 2016

Related U.S. Application Data

(62) Division of application No. 14/001,790, filed as application No. PCT/JP2012/001033 on Feb. 16, 2012, now Pat. No. 9,431,686.

(30) Foreign Application Priority Data

Feb. 28, 2011    (JP) ................................. 2011-042414

(51) Int. Cl.
*H01M 10/6551*    (2014.01)
*H01M 2/10*    (2006.01)
(Continued)

(52) U.S. Cl.
CPC ..... *H01M 10/6551* (2015.04); *H01M 2/1016* (2013.01); *H01M 2/1077* (2013.01);
(Continued)

(58) Field of Classification Search
None
See application file for complete search history.

(56) References Cited

U.S. PATENT DOCUMENTS 9,431,686 B2 *   8/2016   Omura ................ H01M 2/1077
2002/0182480 A1   12/2002   Hanauer et al.
(Continued)

FOREIGN PATENT DOCUMENTS

JP    2004-327311 A    11/2004
JP    2009-152440 A    7/2009
(Continued)

OTHER PUBLICATIONS

Notice of Allowance U.S. Appl. No. 14/001,790 dated Apr. 29, 2016.
(Continued)

*Primary Examiner* — Alix E Eggerding
(74) *Attorney, Agent, or Firm* — McDermott Will & Emery LLP

(57) ABSTRACT

A cell module comprises: a cell stack comprising multiple cells which are electrically connected to each other; a plate-shaped heat dissipating member arranged such that it extends along a direction in which the multiple cells are arranged, and such that it is thermally connected to the multiple cells; and an intervening layer arranged between the cell stack and the heat dissipating member, and configured to allow heat to propagate from the cell stack to the heat dissipating member, and to suppress a relative displacement between the cell stack and the heat dissipating member.

6 Claims, 8 Drawing Sheets

(51) Int. Cl.

| | | |
|---|---|---|
| *H01M 10/04* | (2006.01) | |
| *H01M 10/625* | (2014.01) | |
| *H01M 10/653* | (2014.01) | |
| *H01M 10/647* | (2014.01) | |
| *H01M 10/6554* | (2014.01) | |
| *H01M 10/613* | (2014.01) | |
| *H01M 2/14* | (2006.01) | |

(52) U.S. Cl.
CPC ......... *H01M 2/14* (2013.01); *H01M 10/0413* (2013.01); *H01M 10/613* (2015.04); *H01M 10/625* (2015.04); *H01M 10/647* (2015.04); *H01M 10/653* (2015.04); *H01M 10/6554* (2015.04); *H01M 2/1083* (2013.01); *H01M 2220/20* (2013.01); *Y10T 29/4935* (2015.01)

(56) References Cited

U.S. PATENT DOCUMENTS

| | | |
|---|---|---|
| 2009/0061299 A1 | 3/2009 | Uchida et al. |
| 2011/0104545 A1 | 5/2011 | Meintschel et al. |

FOREIGN PATENT DOCUMENTS

| | | | |
|---|---|---|---|
| JP | 2009-170258 A | | 7/2009 |
| JP | 2010-192207 | * | 2/2010 |
| JP | 2010-108782 A | | 5/2010 |
| JP | 2010-192207 A | | 9/2010 |
| JP | 2011-023296 A | | 2/2011 |

OTHER PUBLICATIONS

Non-Final Office Action U.S. Appl. No. 14/001,790 dated Aug. 28, 2015.

Custom Thermoelectric, How to tell what kind of Peltier Module You Have (Oct. 14, 2007). http://www.customthermoelectric.com/Peltier_analysis.html.

Approved American National Standard (ANSI). American National Standard for Portable Primary Cells and Batteries With Aqueous Electrolyte—General and Specifications (Apr. 20, 2001). ANSI C18.1M, Part 1—2001. http://www.cnlumos.com/lumos/Battery%20Knowledge/Battery%20Standards/ANSI%20C18.1M,%20Part%201-2005.pdf.

International Search Report issued in International Application No. PCT/JP2012/001033 dated May 15, 2012.

* cited by examiner

70

70

CELL MODULE AND MANUFACTURING METHOD FOR CELL MODULE

CROSS-REFERENCE TO RELATED APPLICATIONS

This Application is a Divisional Application of U.S. Ser. No. 14/001,790 filed Aug. 27, 2013, which is the U.S. National Phase of PCT/JP2012/001033 filed Feb. 16, 2012, which claims priority to Japanese Patent Application No. 2011-042414 filed Feb. 28, 2011. The subject matter of each is incorporated herein by reference in entirety.

TECHNICAL FIELD

The present invention relates to a cell module and a manufacturing method for a cell module.

BACKGROUND ART

Typically, each cell (single cell) has a low electromotive force. For example, a lithium-ion cell, which is known as a cell having a relatively high electromotive force, has an electromotive force that is only on the order of 4 V. Thus, in a case in which there is a need to provide a higher voltage, a cell module is known in which multiple cells are connected in series in the form of a module (see Patent document 1). Each typical cell as used here is configured as a flat, box-shaped cell. Such cells are connected in series to each other, so as to form a right-angled parallelepiped shaped cell stack.

A conventional cell module including such a cell stack is housed in a right-angled parallelepiped shaped holder formed of multiple frames, and is mounted on a mounting target such as a vehicle or the like. In a state in which such a cell module is housed in the holder, the cell stack is arranged such that each side of the right-angled parallelepiped cell stack is supported by a corresponding frame, and each surface of the right-angled parallelepiped cell stack is exposed to the exterior. The heat generated in the cell stack is released via heat exchange between the cell stack and the external air with which it is in contact.

Related Art Documents

Patent Documents

[Patent Document 1]
  Japanese Patent Application Laid Open No. 2004-327311

DISCLOSURE OF THE INVENTION

Problem to be Solved by the Invention

In order to provide improved heat dissipation performance to the cell stack having the aforementioned conventional structure, an arrangement is conceivable in which a heat dissipating member having high heat conductivity is arranged such that it is in contact with the exposed faces of the cell stack. However, such a structure in which such a heat dissipating member is arranged such that it is in contact with the cell stack has the following problem. That is to say, in a case in which such a cell module is mounted on a vehicle, a relative displacement occurs between the cell stack and the heat dissipating member due to vibration of the vehicle. In some cases, this leads to collision of the cell stack and the heat dissipating member, resulting in damage to the cells that form the cell stack, which is a problem.

The present invention has been made in order to solve such a problem. Accordingly, it is a general purpose of the present invention to provide a technique for reducing the risk of collision of a heat dissipating member and a cell stack while improving the heat dissipation performance of the cell stack by means of the heat dissipating member.

Means to Solve the Problem

An embodiment of the present invention relates to a cell module. The cell module comprises: a cell stack comprising multiple cells arranged such that they are electrically connected to each other; a heat dissipating member arranged such that it extends along a direction in which the multiple cells are arranged, and such that it is thermally connected to the multiple cells; and an intervening layer arranged between the cell stack and the heat dissipating member, and configured to allow heat to propagate from the cell stack to the heat dissipating member, and to suppress a relative displacement between the cell stack and the heat dissipating member.

Such an embodiment allows the heat dissipating member to provide the cell stack with improved heat dissipation performance. In addition, such an arrangement reduces a risk of collision of the heat dissipating member and the cell stack.

With the aforementioned embodiment, a portion of each of the multiple cells may be embedded in the intervening layer.

With any one the aforementioned embodiments, the intervening layer may be arranged between two adjacent cells.

With any one of the aforementioned embodiments, the intervening layer may be configured to bond each cell of the cell stack to the heat dissipating member.

With any one of the aforementioned embodiments, the intervening layer may comprise: a sheet member arranged on a main face of the heat dissipating member, and configured to prevent the multiple cells from passing through the intervening layer; and an adhesive agent layer laminated on a main face of the sheet member, and configured such that a portion of each cell of the multiple cells is embedded in it.

With any one of the aforementioned embodiments, each cell of the multiple cells may have a terminal formation face and a bottom face that is on a side opposite to the side of the terminal formation face. Also, there may be a difference in a length from the terminal formation face to the bottom face between at least a part of the multiple cells and the other cells. Also, external terminals of adjacent cells of the multiple cells may be connected to each other via a terminal connection member. Also, the terminal formation faces of the cells connected by means of the same terminal connection member may be positioned on approximately the same plane.

With any one of the aforementioned embodiments, the multiple cells may be arranged such that a separator is interleaved between adjacent cells. Also, the cell stack may have recesses on its bottom face on which the heat dissipating member is to be arranged, each of which is defined by a bottom face of the separator and the mutually facing side faces of the two adjacent cells between which the separator is interleaved. Also, the recesses may be each filled with a portion of the intervening layer.

Another embodiment of the present invention relates to a manufacturing method for a cell module. The manufacturing method for a cell module comprises: arranging multiple cells such that their terminal formation faces are positioned on approximately the same plane; fixedly mounting a terminal connection member to external terminals of the multiple cells so as to form a cell stack comprising the multiple cells; laminating an intervening layer on a surface of a heat dissipating member on a side on which the cell stack is to be mounted, as a separate step from the arrangement of the multiple cells and the formation of the cell stack; and pressing into contact the intervening layer and a bottom face of the cell stack that is a side opposite to a side on which the terminal connection member is fixedly mounted, so as to embed a portion of each cell of the multiple cells in the intervening layer.

With the aforementioned embodiment, the manufacturing method for a cell module further comprises: curing the intervening layer so as to fixedly bond the heat dissipating member and the cell stack.

Advantage of the Present Invention

With the present invention, such an arrangement allows a heat dissipating member to provide a cell stack with improved heat dissipation performance. In addition, such an arrangement reduces a risk of collision of the heat dissipating member and the cell stack.

BEST MODE FOR CARRYING OUT THE INVENTION

Description will be made below regarding an embodiment of the present invention with reference to the drawings. It should be noted that, in all the drawings, the same components are denoted by the same reference symbols, and redundant description thereof will be omitted as appropriate.

Embodiment 1

Figure 1:
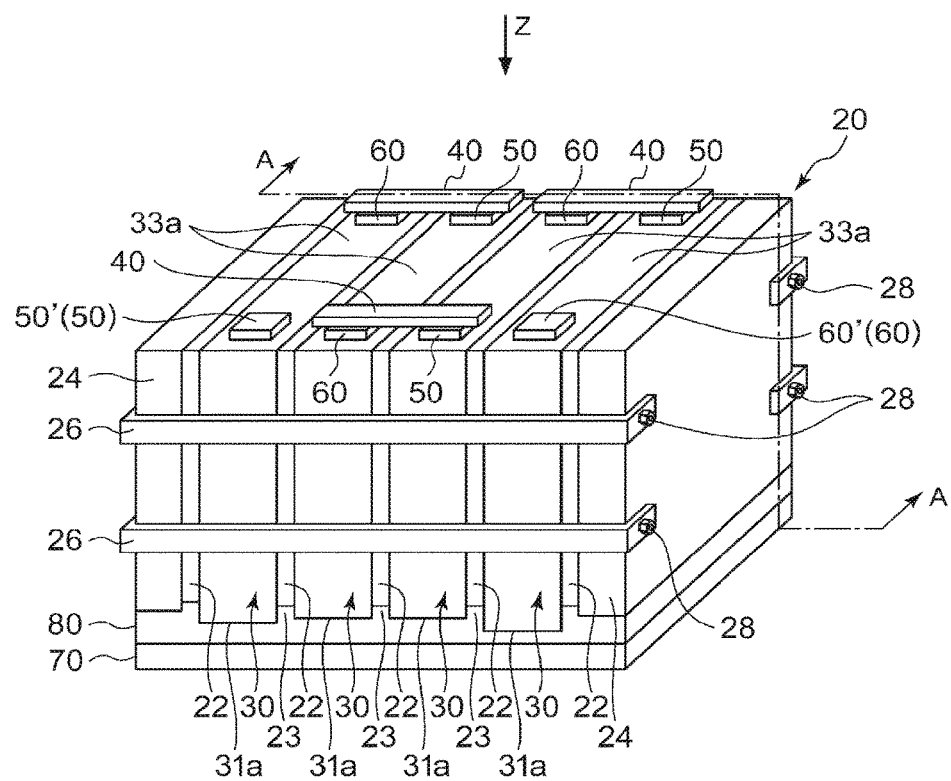
FIG. 1 is a perspective view showing a schematic structure of a cell module according to an embodiment 1.
Figure 2:
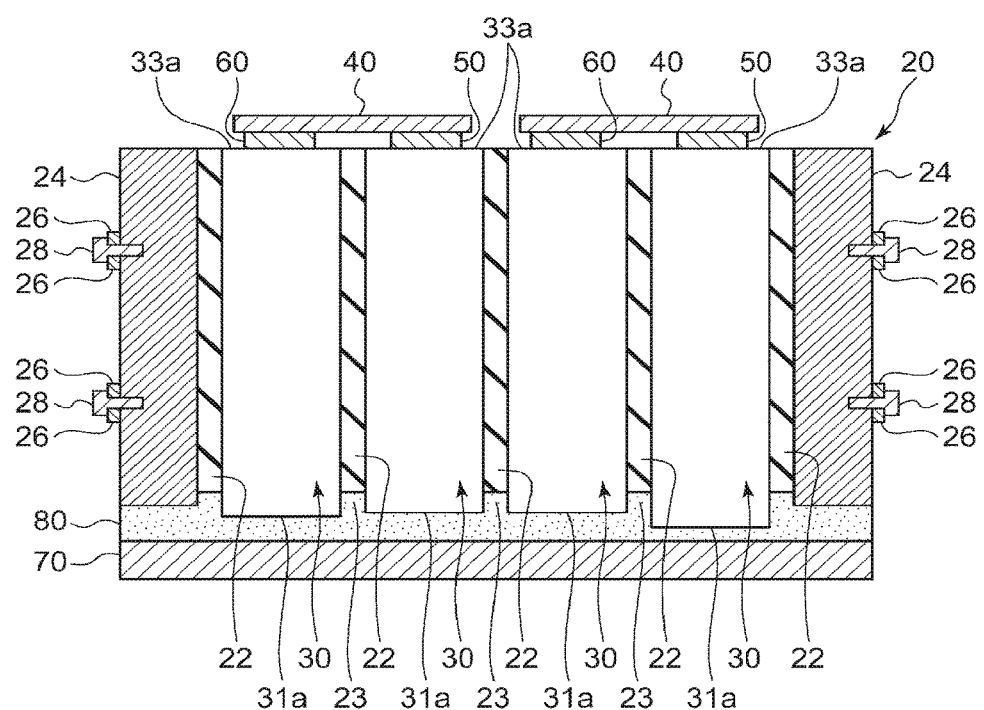
FIG. 2 is a cross-sectional view taken along a plane defined by the line A-A in FIG. 1.

FIG. 1 is a perspective view showing a schematic structure of a cell module according to an embodiment 1. FIG. 2 is a cross-sectional view taken along a plane defined by the line A-A in FIG. 1. It should be noted that, in FIG. 2, the internal components housed in each cell package and fasteners are not shown As shown in FIGS. 1 and 2, a cell module 10 according to the present embodiment includes a cell stack 20, a heat dissipating member 70, and an intervening layer 80.

The cell stack 20 has a structure in which multiple cells 30 are electrically connected to each other by means of bus bars (terminal connecting members) 40. Description will be made in the present embodiment regarding an arrangement in which the cell stack 20 is formed of four cells 30 connected in series.

The four cells 30 are each configured as a flat, box-shaped cell, and are arranged at predetermined intervals such that the longitudinal sides of the cells 30 are arranged approximately in parallel in plan view viewed from the direction denoted by the arrow Z in FIG. 1). Each cell 30 is arranged such that its terminal formation face 33a faces upward. On the terminal formation face 33a, a positive electrode terminal 50 is provided such that it is arranged close to one side of the terminal formation face 33a along the longitudinal direction, and a negative electrode terminal 60 is provided such that it is arranged close to the other side of the terminal formation face 33a. The positive electrode terminal 50 and the negative electrode terminal 60 will be collectively referred to as the "external terminals" hereafter. The cells 30 are arranged such that the arrangement of the positive electrode 50 and the negative electrode 60 of each cell is opposite to that of the adjacent cell 30.

Each pair of adjacent cells 30 are arranged such that the negative electrode terminal 60 of one cell 30 is connected to the positive electrode terminal 50 of the other cell 30 by means of the bus bar 40, thereby connecting the four cells 30 in series. Each bus bar 40 is configured as a band-shaped metal plate. Each bus bar 40 is mounted on corresponding external terminals. Furthermore, the boundary between the region in which each external terminal overlaps the corresponding bus bar 40 and the region in which the external terminal is exposed is welded using a welding method such as laser welding or the like, thereby fixedly mounting each bus bar 40 on the corresponding external terminals. It should be noted that each bus bar 40 may be fixedly connected to the corresponding external terminal via screws or the like.

Such an arrangement allows the positive electrode terminal 50', which is one terminal of the series connection of the cells 30, and the negative electrode terminal 60', which is the other of its terminals, to be connected to an external load (not shown) via external wiring (not shown). It should be noted that the number of cells 30 is not restricted in particular. Also, the multiple cells may be connected to each other in parallel. Alternatively, the multiple cells may be connected to each other in a mixed manner, i.e., series and in parallel.

The multiple cells 30 are arranged such that a plate-shaped separator 22 having a property of electrical insulation is introduced between the adjacent cells 30. The cells 30 and the separators 22 arranged such that the main face of each cell 30 faces the main face of the adjacent separator 22 are fastened by means of a pair of end plates 24 and fasteners 26, thereby forming the cell stack 20.

Specifically, the pair of end plates 24 are arranged such that each end plate is arranged adjacent to the corresponding outermost cell 30 with the separator 22 introduced between them. Thus, a set of the multiple cells 30 and the multiple separators 22 alternately arranged is interleaved between the pair of end plates 24. Each end plate 24 is configured as a metal plate formed of aluminum or the like, for example.

Each end plate 24 is arranged adjacent to a corresponding cell 30 with a separator 22 introduced between them, thereby electrically insulating the end plates 24 from the cells 30. Screw holes (not shown) are formed at predetermined positions in one main face side of each end plate 24 that is the opposite side of the face that is in contact with the separator 22, so as to allow connection screws 28 to be screwed into the end plate 24.

Each fastener 26 is formed of a band-shaped metal plate. Furthermore, each fastener 26 is configured to have bent portions obtained by bending both its ends at 90 degrees. A through hole (not shown) is provided to each bent portion so as to allow the connection screw 28 to pass through as described later. The fasteners 26 are arranged such that each fastener 26 extends along the direction in which the multiple cells 30 are arranged. The fasteners 26 are mounted on both side faces of the set of the cells 30 and the separators 22. With the present embodiment, two fasteners 26 are mounted on each side face. With such an arrangement, the respective bent portions provided to each end of each fastener 26 are arranged on the respective main faces of the pair of end plates 24. Furthermore, each fastener 26 is aligned to the end plates 24 such that each screw hole formed in the main face of the end plate 24 and the corresponding through hole formed in the bent portion are coaxially arranged.

In this state, each connection screw 28 is passed through the through hole formed in the bent portion of the fastener 26, and is screwed into the screw hole formed in the end plate 24. This allows the set of the multiple cells 30 and the multiple separators 22 to be fastened by means of the end plates 24 and the fasteners 26 along the direction in which the cells 30 are arranged.

Figure 3:
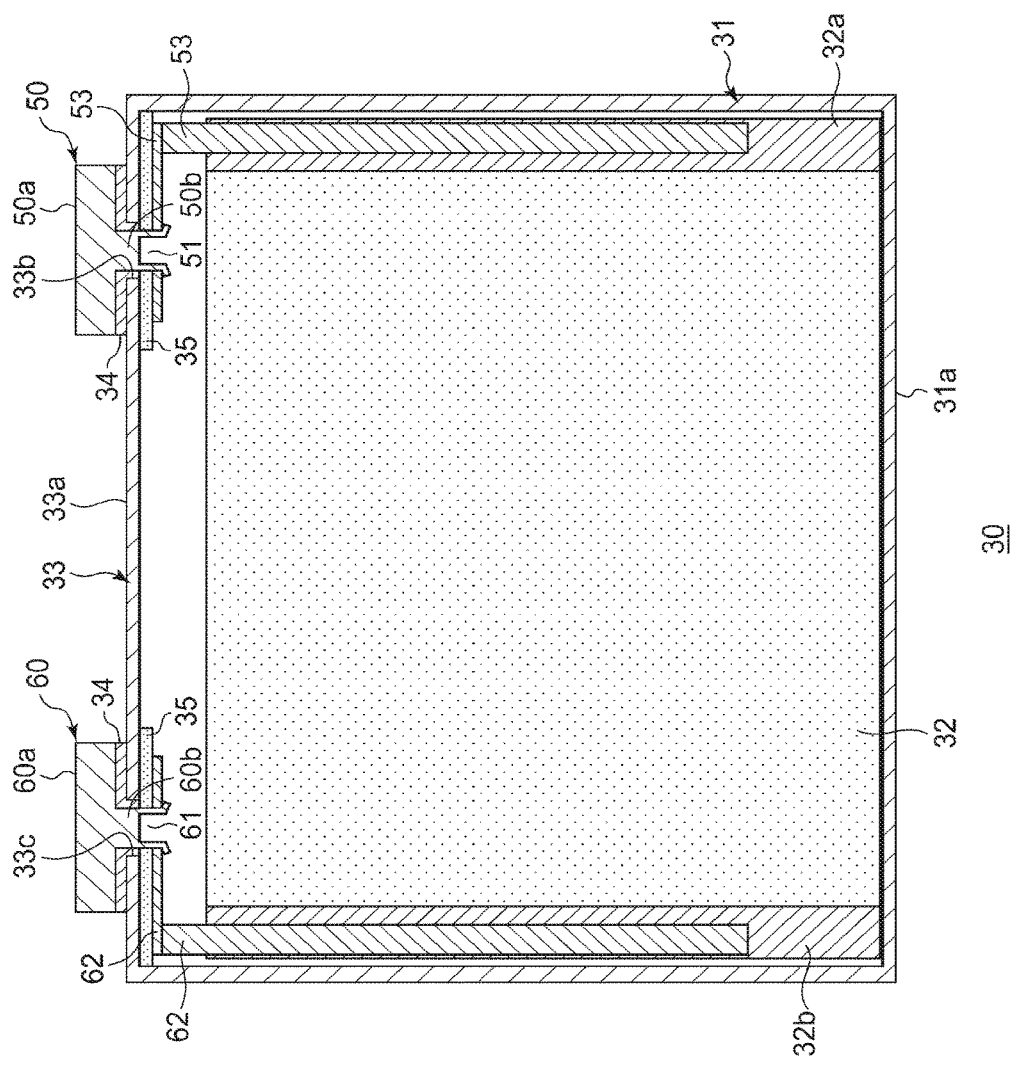
FIG. 3 is a cross-sectional view showing a schematic structure of a cell.

FIG. 3 is a cross-sectional view showing a schematic structure of the cell. As shown in FIG. 3, the cell 30 has a structure in which a wound electrode body 32 having a positive electrode and a negative electrode which are wound in a spiral is housed in an outer package (housing) 31 laterally with respect to the package axis of the outer package 31. The opening of the outer package 31 is sealed by means of a sealing plate 33 configured as a component of the housing. The positive electrode terminal 50 includes a plate portion 50a and a protruding portion 50b that protrudes from one main face of the plate portion 50a, and is provided to the sealing plate 33. Furthermore, the negative electrode terminal 60 includes a plate portion 60a and a protruding portion 60b that protrudes from one main face of the plate portion 60a, and is provided to the sealing plate 33. Moreover, a gas discharge valve (not shown) is formed in the sealing plate 33. The sealing plate 33 defines the terminal formation face 33a, and the face of the outer package 31 that is opposite to the terminal formation face 33a defines a bottom face 31a of the cell 30.

The protruding portion 50b of the positive electrode terminal 50 is inserted into a positive electrode opening 33b formed in the sealing plate 33 in a state in which its side face in contact with a gasket 34. Furthermore, the protruding portion 50b is connected to a positive electrode tab member 53 arranged on the sealing plate 33 on the inner face side of the cell. It should be noted that a recess 51 is provided to the end of the protruding portion 50b such that a side wall is formed along the positive electrode opening 33b. By swaging the protruding portion 50b such that the edges of the recess 51 are widened, positive electrode terminal 50 is fixedly connected to the positive electrode tab member 53.

An insulating plate 35 is provided between the positive electrode tab member 53 and the sealing plate 33 on the inner face side of the cell. The insulating plate 35 and the gasket 34 are arranged such that they are in contact with each other in the positive electrode opening 33b. Such an arrangement insulates the positive electrode tab member 53 and the positive electrode terminal 50 from the sealing plate 33. The positive electrode tab member 53 is connected to a positive electrode collecting plate set 32a that protrudes from one end face of the electrode body 32. It should be noted that the positive electrode collecting plate set 32a is configured as a set of multiple bundled positive electrode collecting plates that protrude from one end face of the electrode body 32.

The protruding portion 60b of the negative electrode terminal 60 is inserted into a negative electrode opening 33c formed in the sealing plate 33 in a state in which its side face is in contact with a gasket 34. Furthermore, the protruding portion 60b is connected to a negative electrode tab member 62 arranged on the sealing plate 33 on the inner face side of the cell. It should be noted that a recess 61 is provided to the end of the protruding portion 60b such that a side wall is formed along the negative electrode opening 33c. By swaging the protruding portion 60b such that the edges of the recess 61 are widened, the negative electrode terminal 60 is fixedly connected to the negative electrode tab member 62.

An insulating plate 35 is provided between the negative electrode tab member 62 and the sealing plate 33 on the inner face side of the cell. The insulating plate 35 and the gasket 34 are arranged such that they are in contact with each other in the negative electrode opening 33c. Such an arrangement insulates the negative electrode tab member 62 and the negative electrode terminal 60 from the sealing plate 33. The negative electrode tab member 62 is connected to a negative electrode collecting plate set 32b that protrudes from the other end face of the electrode body 32. It should be noted that the negative electrode collecting plate set 32b is configured as a set of multiple bundled negative electrode collecting plates that protrude from the other end face of the electrode body 32.

The plate portions 50a and 60a are arranged such that their main faces extend along the surface of the sealing plate 33. With the present embodiment, the main face of the plate portion 50a on the side from which the protruding portion 50b protrudes and the main face of the plate portion 60a on the side from which the protruding portion 60b protrudes are each in contact with the surface of the sealing plate 33.

As shown in FIGS. 1 and 2, the heat dissipating member 70 is arranged on the bottom side of the cell stack 20 such that it extends along the direction in which the multiple cells 30 are arranged. The heat dissipating member 70 is formed of a metal plate having high heat conductivity such as aluminum, copper, or the like, for example. The heat dissipating plate 70 is thermally connected to each of the cells 30 of the cell stack 20 via the intervening layer 80 described later.

The intervening layer 80 is arranged between the cell stack 20 and the heat dissipating member 70 so as to bond each cell 30 of the cell stack 20 and the heat dissipating member 70. The intervening layer 80 is formed of a cold-curing adhesive agent including epoxy resin, for example. The intervening layer 80 is configured to bond each cell 30 of the cell stack 20 and the heat dissipating member 70, thereby fixedly bonding the cells 30 and the heat dissipating member 70. Other examples of such a material that forms the intervening layer 80 include acrylic resin, silicone resin, and so forth. The intervening layer 80 may be configured to function as an elastic layer after curing. Such an arrangement reduces or prevents propagation of the vibration of the heat dissipating member 70 to the cells 30.

As described above, by introducing the intervening layer 80 between the cell stack 20 and the heat dissipating member 70, such an arrangement suppresses a relative displacement between the cell stack 20 and the heat dissipating member 70. Thus, such an arrangement reduces the risk of collision of the cell stack 20 and the heat dissipating member 70. Furthermore, such an arrangement is capable of suppressing a relative displacement between the cell stack 20 and the heat dissipating member 70, thereby reducing deterioration due to friction between each component of the cell module 10.

Furthermore, the intervening layer 80 is formed of a material having high heat conductivity. Thus, the intervening layer 80 allows heat to be transmitted from the cell stack 20 to the heat dissipating member 70. Typically, in many cases, there is a difference in size between each of the cells 30 due to the manufacturing margin of error and so forth. Accordingly, there is a difference in the length from the terminal formation face 33a to the bottom face 31a between at least a part of the multiple cells 30 included in the cell stack 20 and the other cells 30. The maximum difference in the aforementioned length is approximately 0.3 mm, for example.

The multiple cells 30 are arranged such that the external terminals of the adjacent cells 30 are connected via the plate-shaped bus bar 40. Thus, the cells 30 connected via the same bus bar 40 are arranged such that their terminal formation faces 33a are positioned on approximately the same single plane. With the present embodiment, the terminal formation faces 33a of the cells 30 are all positioned on approximately the same single plane. Here, examples represented by the phrase "the faces are positioned on approximately the same single plane" include a case in which the faces deviate from the same plane, but are positioned in a range that provides the effects of the present invention, in addition to a case in which the faces are perfectly positioned on the same plane.

Accordingly, there is a difference in the position of the bottom face 31a between at least a part of the cells 30 and the other cells 30. That is to say, they differ in terms of the distance from the bottom face 31a to the top face of the heat dissipating member 70. Thus, there are irregularities on the bottom face of the cell stack 20 due to the difference in the length from the terminal formation face 33a to the bottom face 31a of each cell 30. In a case in which the heat dissipating member 70 is arranged such that it is directly in contact with the cell stack 20, it is difficult to arrange the cells 30 such that all the cells 30 are in contact with the heat dissipating member 70 due to the irregularities at the bottom of the cell stack 20. If there is a cell 30 arranged such that it is not in contact with the heat dissipating member 70, this degrades the heat dissipation performance of the cell 30. This leads to the occurrence of local heat concentration in the cell stack 20.

In contrast, with the cell module 10 according to the present embodiment, a portion of each cell 30 of the cell stack 20 is embedded in the intervening layer 80. That is to say, the irregularities that occur due to the differences in the length from the terminal formation face 33a of each cell 30 to the bottom face 31a are absorbed by the intervening layer 80. Thus, such an arrangement allows all the cells 30 to be thermally connected to the heat dissipating member 70 via the intervening layer 80. As a result, such an arrangement avoids a problem of the occurrence of local heat concentration in the cell stack 20.

Each separator 22 is designed such that the length between its top face and its bottom face that is opposite to the top face is smaller than the shortest length between the terminal formation face 33a and the bottom face 31a of the cells 30. With such an arrangement, recesses 23 are formed in the bottom face of the cell stack 20 on which the heat dissipating member 70 is to be arranged. Each recess 23 is defined by the bottom face of the corresponding separator 22 and the facing side faces of the two adjacent cells 30 between which the separator 22 is introduced.

Each recess 23 formed in the bottom face of the cell stack 20 is filled by a portion of the intervening layer 80. That is to say, a portion of the intervening layer 80 is introduced between two adjacent cells 30. Such an arrangement suppresses a relative displacement between the two adjacent cells 30, thereby improving the strength of the cell stack 20. This provides improved strength of the cell module 10. Furthermore, each recess 23 is filled with a portion of the intervening layer 80. That is to say, the space defined by each recess 23 is filled with a portion of the intervening layer 80. Thus, such an arrangement avoids a problem of the occurrence of moisture condensation and so forth which can occur in a space defined by the recess 23 in a case in which the recesses 23 are not filled with the intervening layer 80.

It should be noted that the main face of the cell 30 arranged on the outermost side of the cell stack 20, the main face of the corresponding end plate 24, and the bottom face of the separator 22 interleaved between them also define a recess. Such a recess is also filled with a portion of the intervening layer 80. Thus, such an arrangement suppresses a relative displacement between the cell 30 and the end plate 24 by means of the intervening layer 80.

Furthermore, the intervening layer 80 has a property of electrical insulation. This ensures that there is electrical insulation between the cell stack 20 and the heat dissipating member 70. Furthermore, such an intervening layer 80 having a property of electrical insulation allows a metal material having high heat conductivity to be employed as the heat dissipating member 70.

The cell module 10 having the aforementioned structure can be manufactured as follows, for example. FIGS. 4A through 6B are process diagrams for describing a manufacturing method for the cell module according to the embodiment 1.

Figure 4A:
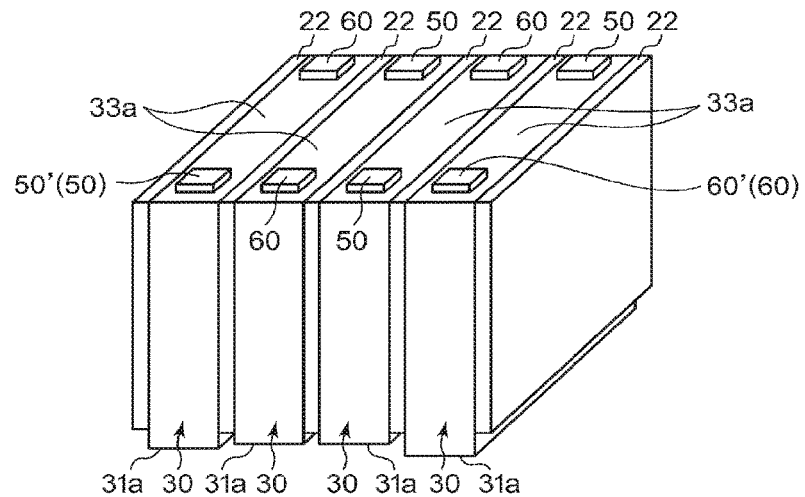
FIGS. 4A through 4C are process diagrams for describing a manufacturing method for the cell module according to the embodiment 1.

First, as shown in FIG. 4A, four cells 30 and five separators 22 are arranged at predetermined intervals such that their longitudinal axes are arranged approximately in parallel in plan view. The four cells 30 and the five separators 22 are alternately arranged. Furthermore, the cells 30 are aligned such that their terminal formation faces 33a are positioned on approximately the same plane. Moreover, the separators 22 are aligned such that their top faces are positioned on approximately the same plane on which the terminal formation faces 33a of the cells 30 are positioned. For example, the four cells 30 and the five separators 22 are held such that the terminal formation faces 33a of the cells 30 and the top faces of the separators 22 are in contact with a base. This allows the terminal formation faces 33a and the top faces to be arranged on approximately the same plane.

Figure 4B:
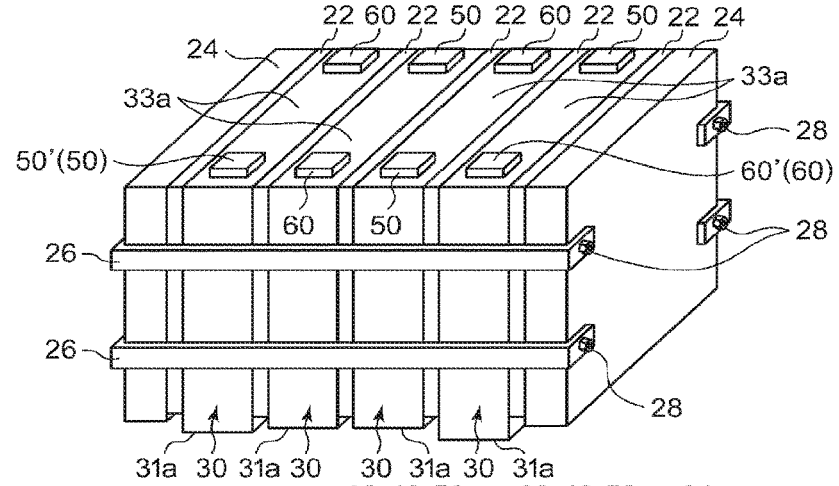

Next, as shown in FIG. 4B, a set of four cells 30 alternately arranged with five separators 22 is interleaved between a pair of end plates 24. Furthermore, fasteners 26 are mounted on both side faces of the cell/separator set, and the connection screws 28 are screwed in. This allows the set of the cells 30 and the separators 22 to be fastened along the direction in which the cells 30 and the separators 22 are arranged.

Figure 4C:
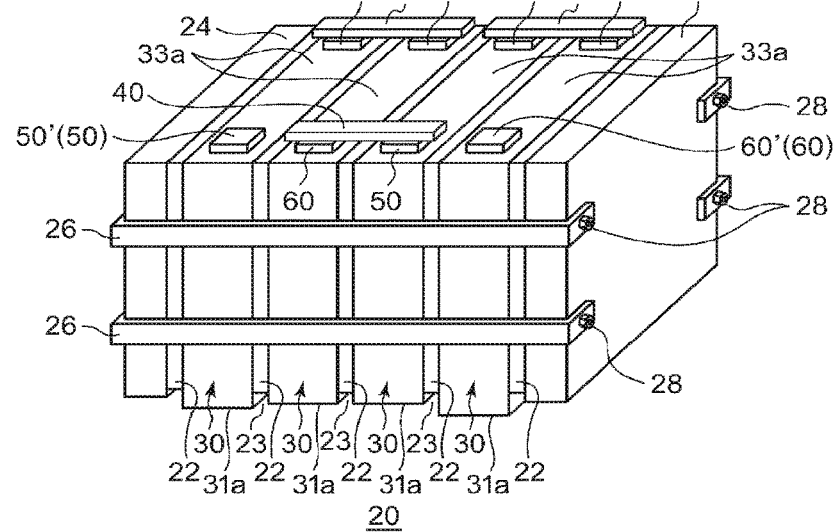

Next, as shown in FIG. 4C, the bus bars 40 are arranged on the external terminals of the cells 30. Specifically, each bus bar 40 is arranged such that its main face on one of its end sides is in contact with the negative electrode terminal 60 of one of two adjacent cells 30, and the main face on the other of its end sides is in contact with the positive electrode terminal 50 of the other of these cells 30. Next, each bus bar 40 is welded and fixed to the corresponding external terminals of the cells 30, thereby forming the cell stack 20 including the four cells 30.

Figure 5A:
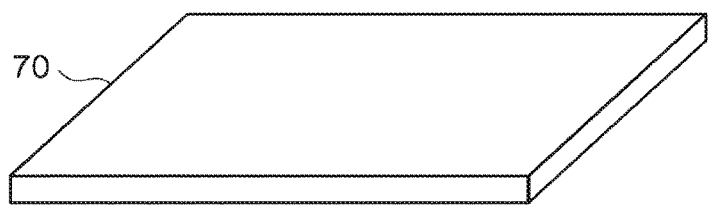
FIGS. 5A and 5B are process diagrams for describing a manufacturing method for the cell module according to the embodiment 1.
Figure 5B:
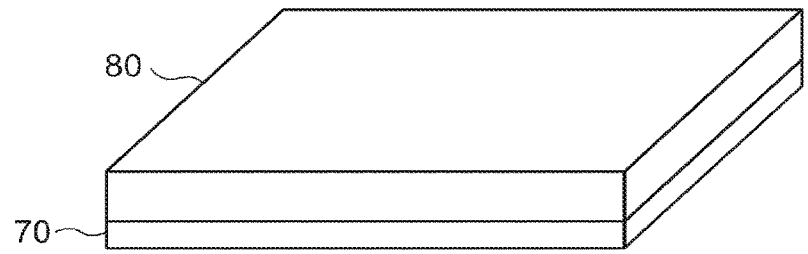

Furthermore, a step in which the intervening layer 80 is laminated on the main face of the heat dissipating member 70 is executed, in addition to the aforementioned step in which the multiple cells 30 are arranged, and the aforementioned step in which the bus bars 40 are connected to the cells 30 so as to form the cell stack 20. Specifically, as shown in FIG. 5A, the heat dissipating member 70 is prepared. Next, as shown in FIG. 5B, the intervening layer 80 is formed using a known method on the surface of the heat dissipating member 70 on the side on which the cell stack 20 is to be mounted. For example, the intervening layer 80 may be formed by applying a sheet-shaped adhesive member to the main face of the heat dissipating member 70. Also, the intervening layer 80 may be formed by coating the main face of the heat dissipating member 70 with an adhesive agent using a squeegee or the like.

Figure 6A:
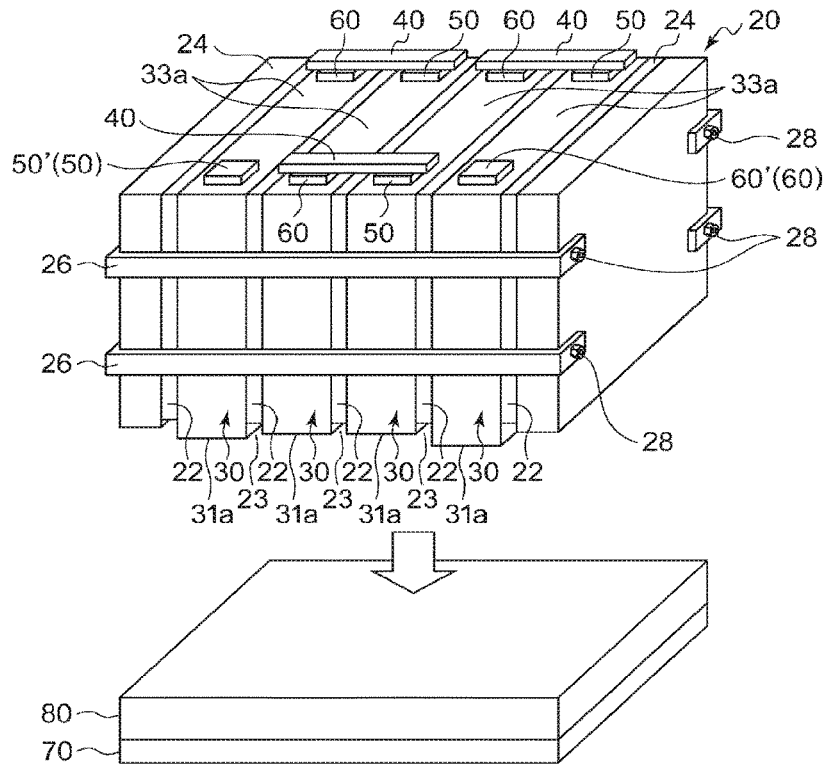
FIGS. 6A and 6B are process diagrams for describing a manufacturing method for the cell module according to the embodiment 1.
Figure 6B:
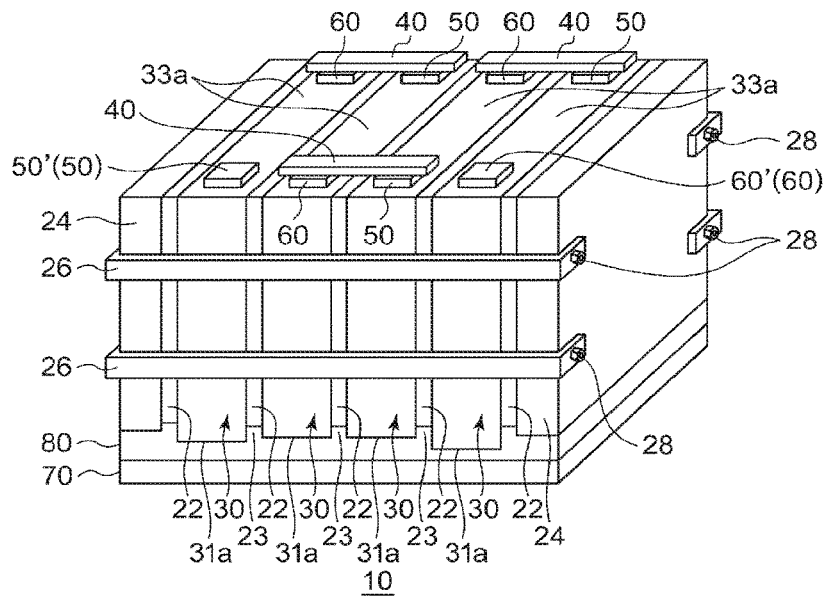

Next, as shown in FIG. 6A, the bottom face of the cell stack 20, which is the side opposite to the side on which the bus bars 40 are fixedly mounted, i.e., bottom face 31a of each cell 30, is pressed into contact with the intervening layer 80. Thus, as shown in FIG. 6B, a portion of each cell 30 is embedded in the intervening layer 80. The depth to which the cell stack 20 is embedded in the intervening layer 80 is adjusted such that no cell 30 passes through the intervening layer 80. Subsequently, the intervening layer 80 is cured, thereby fixedly bonding the heat dissipating member 70 and the cell stack 20. By executing the aforementioned steps, the cell module 10 is formed.

As described above, with the cell module 10 according to the present embodiment, the intervening layer 80 is arranged between the cell stack 20 and the heat dissipating member 70 in order to suppress a relative displacement between the cell stack 20 and the heat dissipating member 70. Such an arrangement reduces the risk of collision of the cell stack 20 and the heat dissipating member 70 even if vibration occurs in the cell module 10 due to an external factor, in addition to providing improved heat dissipation performance of the cell stack 20 by means of the heat dissipating member 70. As a result, such an arrangement suppresses the occurrence of damage at the cell stack 20, thereby providing the cell module 10 with a long service life. Furthermore, such an arrangement is capable of relaxing vibrations propagating from the heat dissipating member 70 to the cell stack 20. Thus, such an arrangement prevents damage of the cells 30.

Second Embodiment

The point of difference in the cell module 10 between an embodiment 2 and the aforementioned embodiment 1 is that, in the embodiment 2, the intervening layer 80 has a multi-layer structure. Description will be made below regarding the present embodiment. It should be noted that the basic structures of the cell stack 20 and the heat dissipating member 70 are the same as those of the embodiment 1. The same components as those in the embodiment 1 will be denoted by the same reference symbols, and description thereof will be omitted as appropriate.

Figure 7:
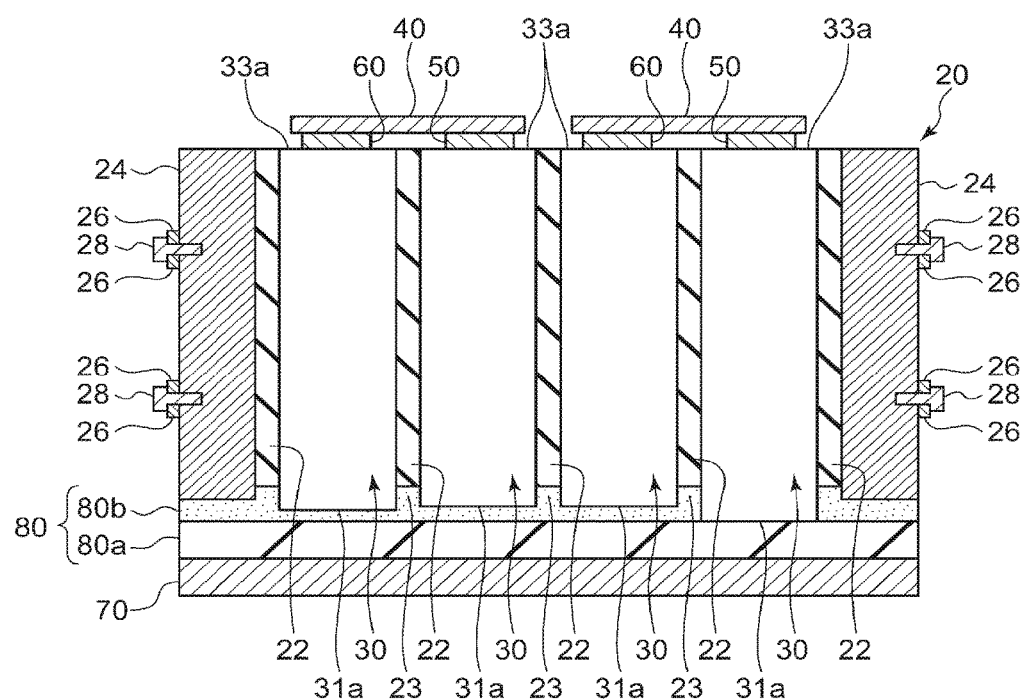
FIG. 7 is a cross-sectional view showing a schematic structure of a cell module according to an embodiment 2.

FIG. 7 is a cross-sectional diagram showing a schematic structure of a cell module according to the embodiment 2. It should be noted that the internal components of each cell included within the housing are not shown in FIG. 7. With the cell module 10 according to the present embodiment, the intervening layer 80 includes a sheet member 80a and an adhesive agent layer 80b.

The sheet member 80a is provided on the main face of the heat dissipating member 70. The sheet member 80a is configured to prevent the multiple cells 30 from passing through the intervening layer 80. For example, the sheet member 80a is formed as a resin sheet, a rubber sheet, or the like, having a property of heat conductivity and a property of electrical insulation.

The adhesive agent layer 80b is laminated on the main face of the sheet member 80a. A portion of each of the multiple cells 30 is embedded in the adhesive agent layer 80b. The adhesive agent layer 80b is formed of the same material as that of the intervening layer 80 described in the embodiment 1.

The manufacturing method for the cell module 10 according to the present embodiment is the same as the manufacturing method for the cell module 10 according to embodiment 1, except for the step shown in FIG. 5B in which the intervening layer 80 is laminated on the main face of the heat dissipating member 70. Specifically, first, the sheet member 80a is fixedly mounted on the main face of the heat dissipating member 70 prepared beforehand. The sheet member 80a is fixedly mounted on the heat dissipating member 70 by means of an adhesive agent, for example. Next, a sheet-shaped adhesive member is applied to the main face of the sheet member 80a, or otherwise the main face of the sheet member 80a is coated with an adhesive agent using a squeegee or the like, thereby forming the adhesive agent layer 80b. By executing the aforementioned steps, the intervening layer 80, which comprises the sheet member 80a and the adhesive agent layer 80b, is formed on the main face of the heat dissipating member 70.

As described above, with the cell module 10 according to the present embodiment, the intervening layer 80 includes: the sheet member 80a configured to prevent the multiple cells 30 from passing through the intervening layer 80; and the adhesive agent layer 80b in which a portion of each of the multiple cells 30 is embedded. Such an arrangement reduces a risk of collision of the cell stack 20 and the heat dissipating member 70 due to a relative displacement between them. Furthermore, in the manufacturing process for the cell module 10, in the step in which the cell stack 20 is pressed into contact with the intervening layer 80, there is no need to adjust the depth to which the cell stack 20 is embedded into the intervening layer 80 with high precision. Thus, such an arrangement provides a simplified manufacturing method for the cell module 10.

The present invention is by no means intended to be restricted to the aforementioned embodiments. Also, various designs and so forth may be modified based on the knowledge of those skilled in this art, which are also encompassed within the scope of the present invention.

Description has been made in the aforementioned embodiments regarding an arrangement in which the heat dissipating member 70 is configured as a plate-shaped metal plate. Also, the heat dissipating member 70 may be formed in a shape as described below.

Figure 8A:
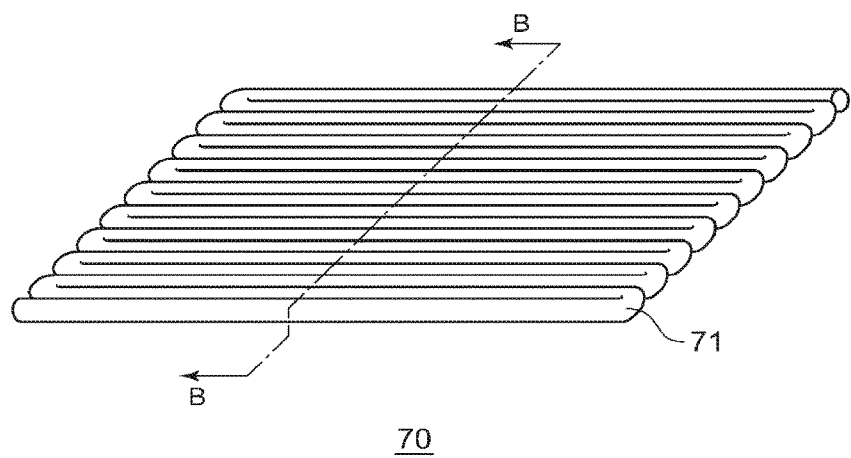
FIG. 8A is a perspective view showing a schematic structure of a cell module according to a modification.
Figure 8B:
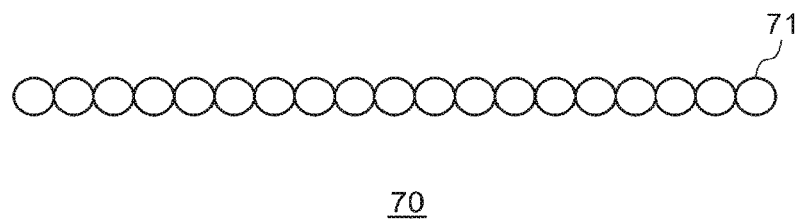
FIG. 8B is a cross-sectional view taken along a plane defined by the line B-B in FIG. 8A.

FIG. 8A is a perspective view showing a schematic structure of a heat dissipating member according to a modification. FIG. 8B is a cross-sectional view taken along the plane defined by the line B-B in FIG. 8A. As shown in FIGS. 8A and 8B, the heat dissipating member 70 is configured as a cylindrical pipe 71 folded in a zigzag manner.

That is to say, the pipe 71 is arranged such that it extends from one side to the opposite side of the heat dissipating member 70 that is to be formed. Next, when the pipe 71 reaches the opposite side, the pipe 71 is bent in a U shape, and is arranged such that it extends toward the aforementioned one side. Next, when the pipe 71 reaches the aforementioned one side, the pipe 71 is again bent in a U shape. These steps are repeatedly executed, thereby forming the heat dissipating member 70. It should be noted that examples of such a heat dissipating member 70 include a metal plate having a slit formed at a predetermined position.

DESCRIPTION OF THE REFERENCE NUMERALS 10 cell module, 20 cell stack, 22 separator, 23 recess, 30 cell, 31a bottom face, 33a terminal formation face, 50, 50' positive electrode terminal, 60, 60' negative electrode terminal, 70 heat dissipating member, 80 intervening layer, 80a sheet member, 80b adhesive agent layer.

INDUSTRIAL APPLICABILITY

The present invention can be applied to a cell module and a manufacturing method for a cell module.

The invention claimed is:

1. A cell module comprising:
a cell stack comprising a plurality of cells, the plurality of cells being arranged along a predetermined direction;
a heat dissipating member extending along the predetermined direction, the heat dissipating member being thermally coupled to the plurality of cells; and
an intervening layer arranged between the cell stack and the heat dissipating member, the intervening layer configured to allow heat to propagate from the cell stack to the heat dissipating member, and to suppress a relative displacement between the cell stack and the heat dissipating member, wherein:
the intervening layer includes:
an insulating sheet member arranged between the cell stack and the heat dissipating member, the insulating sheet member configured to prevent the plurality of cells from passing through the intervening layer; and
an adhesive agent layer laminated on a main face of the insulating sheet member, the adhesive agent layer configured such that a portion of each cell of the plurality of cells is embedded in it,
the insulating sheet member includes a resin or a rubber sheet, and
the insulating sheet member has a property of heat conductivity and a property of electrical insulating.

2. The cell module according to claim 1, wherein:
the cell stack includes at least one recess on a bottom surface over which the heat dissipating member is arranged, and
the at least one recess is filled with a portion of the adhesive agent layer.

3. A cell module comprising:
a cell stack comprising a plurality of cells, the plurality of cells being arranged along a predetermined direction;
a heat dissipating member extending along the predetermined direction, the heat dissipating member being thermally coupled to the plurality of cells; and
an intervening layer arranged between the cell stack and the heat dissipating member, the intervening layer configured to allow heat to propagate from the cell stack to the heat dissipating member, and to suppress a relative displacement between the cell stack and the heat dissipating member, wherein:
the intervening layer includes:
an insulating sheet member arranged between the cell stack and the heat dissipating member, the insulating sheet member configured to prevent the plurality of cells from passing through the intervening layer; and
an adhesive agent layer laminated on a main face of the insulating sheet member, the adhesive agent layer configured such that a portion of each cell of the plurality of cells is embedded in it, and
the adhesive agent layer includes a cold-curing adhesive agent.

4. The cell module according to claim 3, wherein:
the cell stack includes at least one recess on a bottom surface over which the heat dissipating member is arranged, and
the at least one recess is filled with a portion of the adhesive agent layer.

5. A cell module comprising:
a cell stack comprising a plurality of cells, the plurality of cells being arranged along a predetermined direction;
a heat dissipating member extending along the predetermined direction, the heat dissipating member being thermally coupled to the plurality of cells; and
an intervening layer arranged between the cell stack and the heat dissipating member, the intervening layer configured to allow heat to propagate from the cell stack to the heat dissipating member, and to suppress a relative displacement between the cell stack and the heat dissipating member, wherein:
the intervening layer includes:
an insulating sheet member arranged between the cell stack and the heat dissipating member, the insulating sheet member configured to prevent the plurality of cells from passing through the intervening layer; and
an adhesive agent layer laminated on a main face of the insulating sheet member, the adhesive agent layer configured such that a portion of each cell of the plurality of cells is embedded in it, and
the adhesive agent layer is in contact with mutually facing faces of two adjacent cells of the plurality of cells and bottom faces of the two adjacent cells.

6. The cell module according to claim 5, wherein:
the cell stack includes at least one recess on a bottom surface over which the heat dissipating member is arranged, and
the at least one recess is filled with a portion of the adhesive agent layer.

* * * * *